Figure 1:
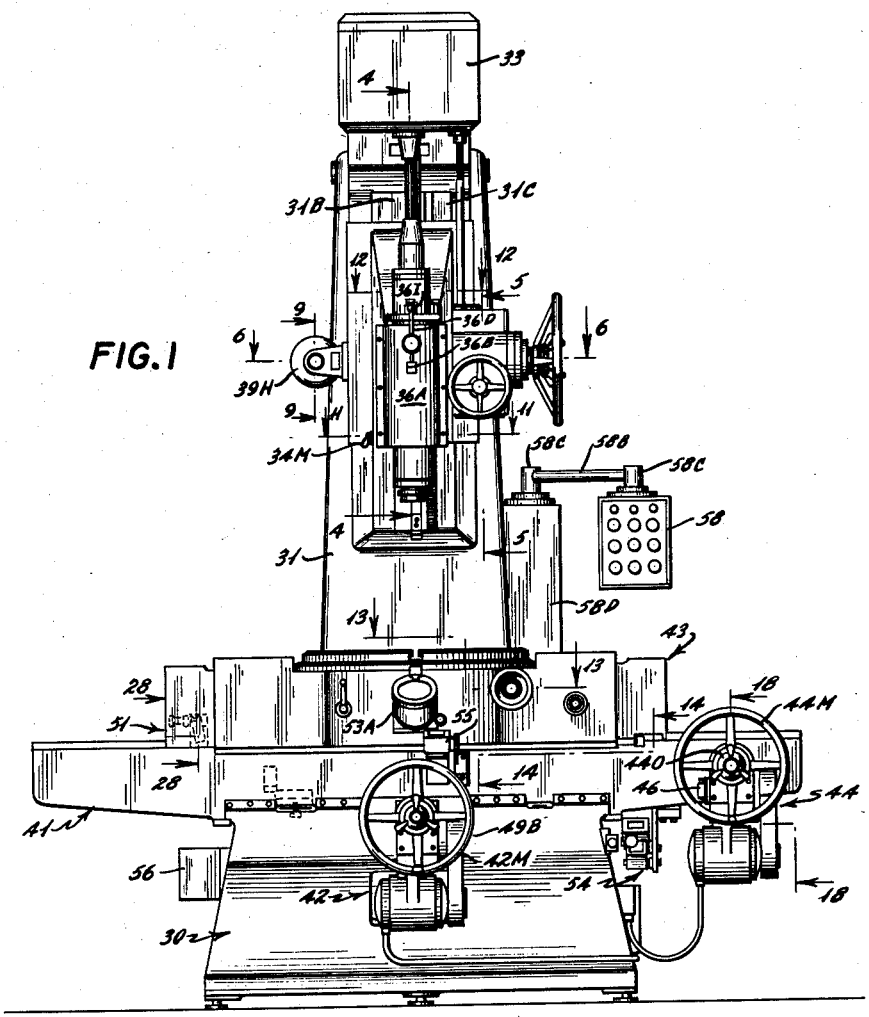

June 29, 1965   M. P. BUDNEY ETAL   3,191,461
JIG BORER
Filed April 17, 1961   14 Sheets-Sheet 2
FIG. 2
FIG. 29
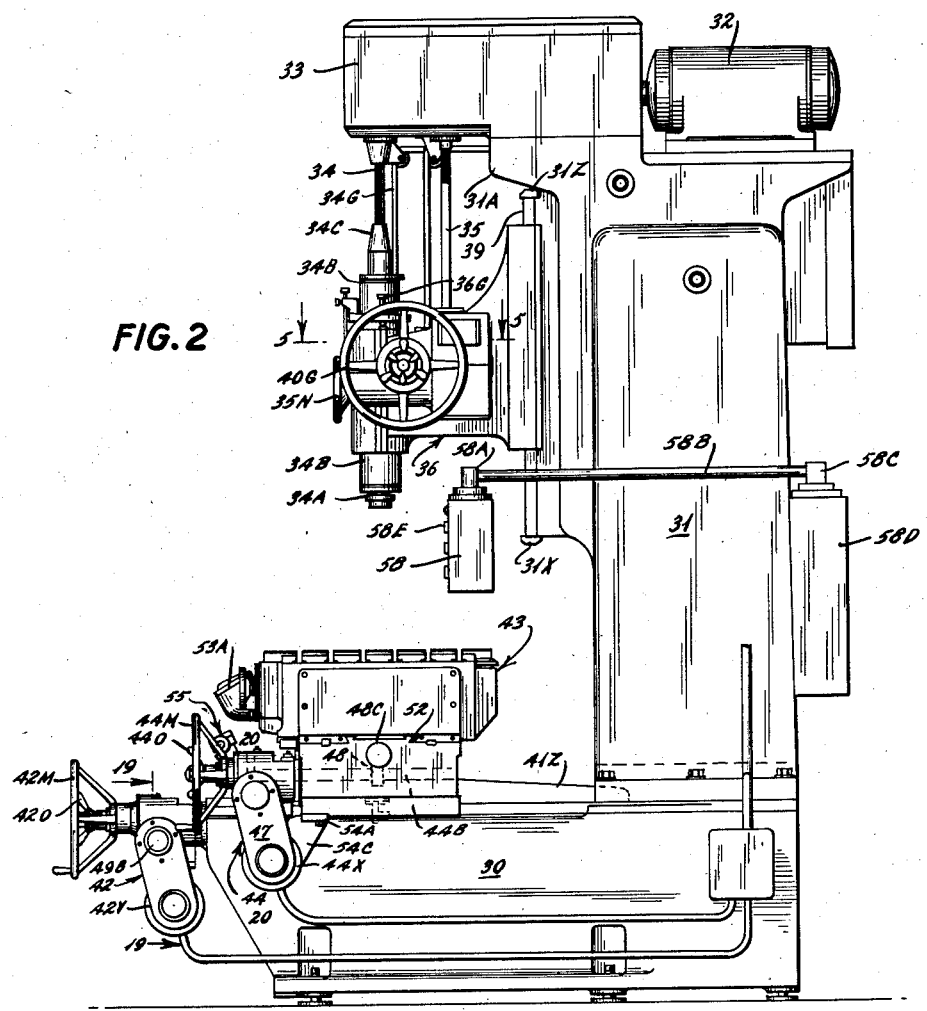
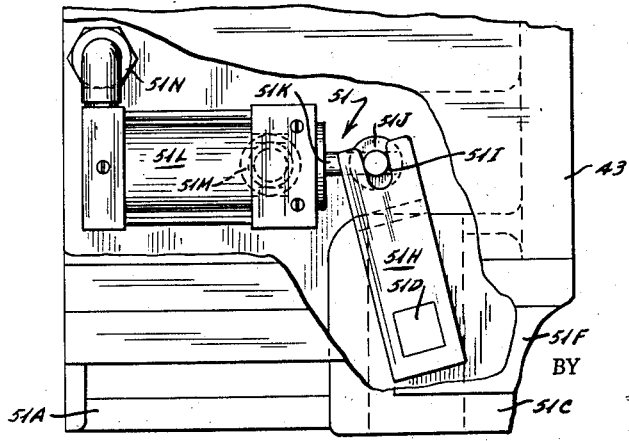
INVENTORS
M.P. BUDNEY,
H.S. BUDNEY,
T.W. BUDNEY &
M.F. SACZAWA
BY
ATTORNEY June 29, 1965  M. P. BUDNEY ETAL  3,191,461
JIG BORER
Filed April 17, 1961  14 Sheets-Sheet 3
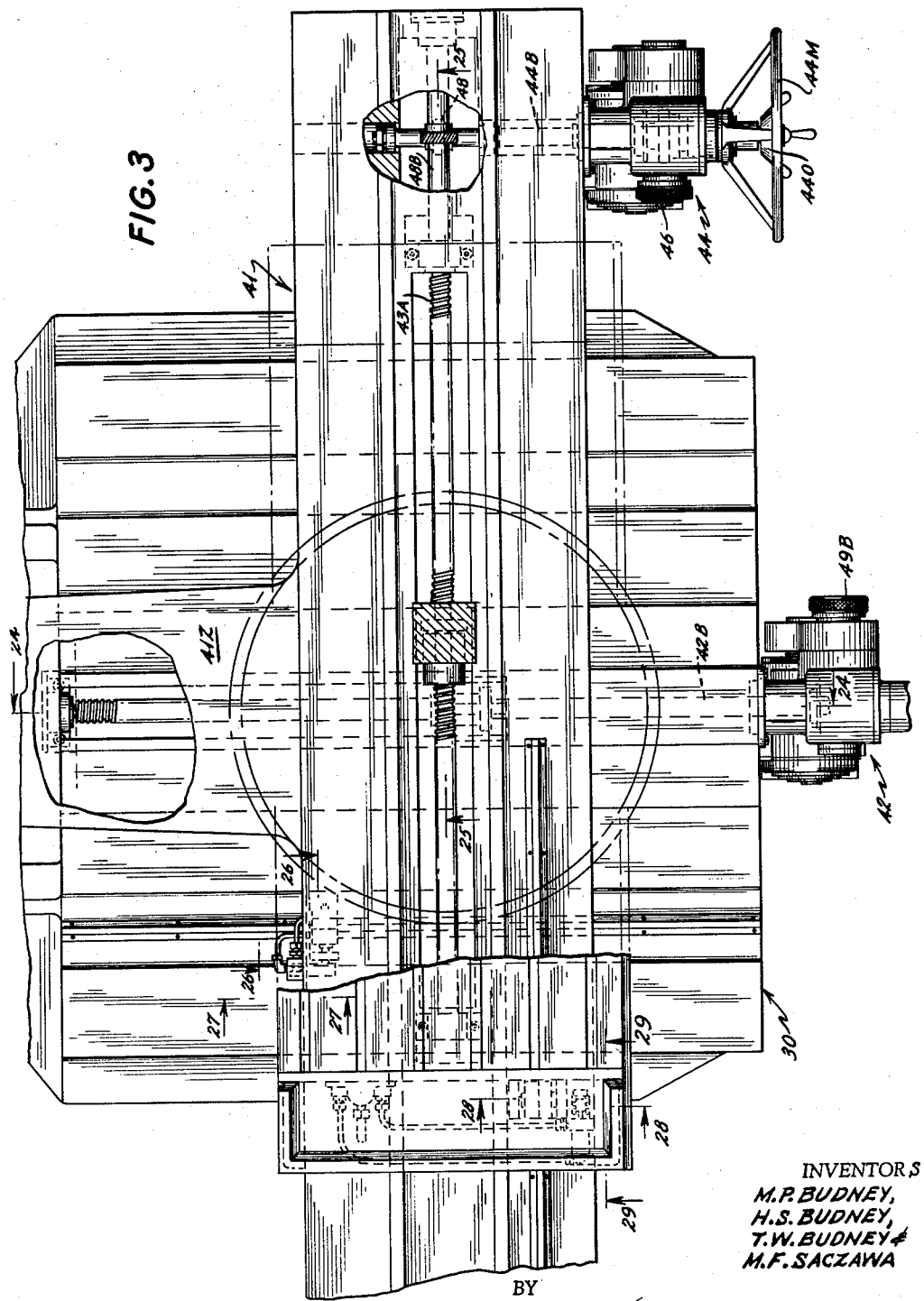
INVENTORS
M.P. BUDNEY,
H.S. BUDNEY,
T.W. BUDNEY &
M.F. SACZAWA
BY
ATTORNEY

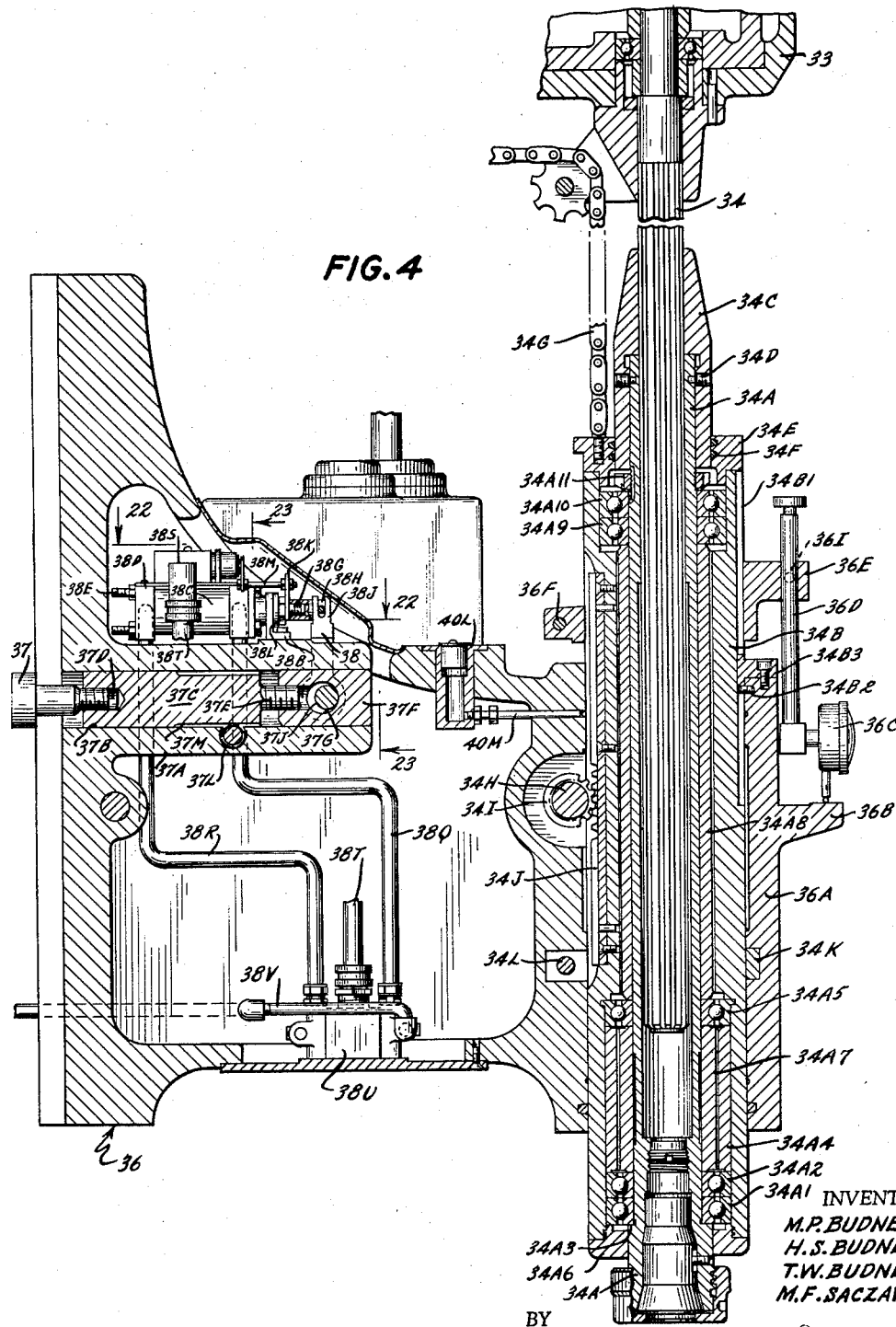

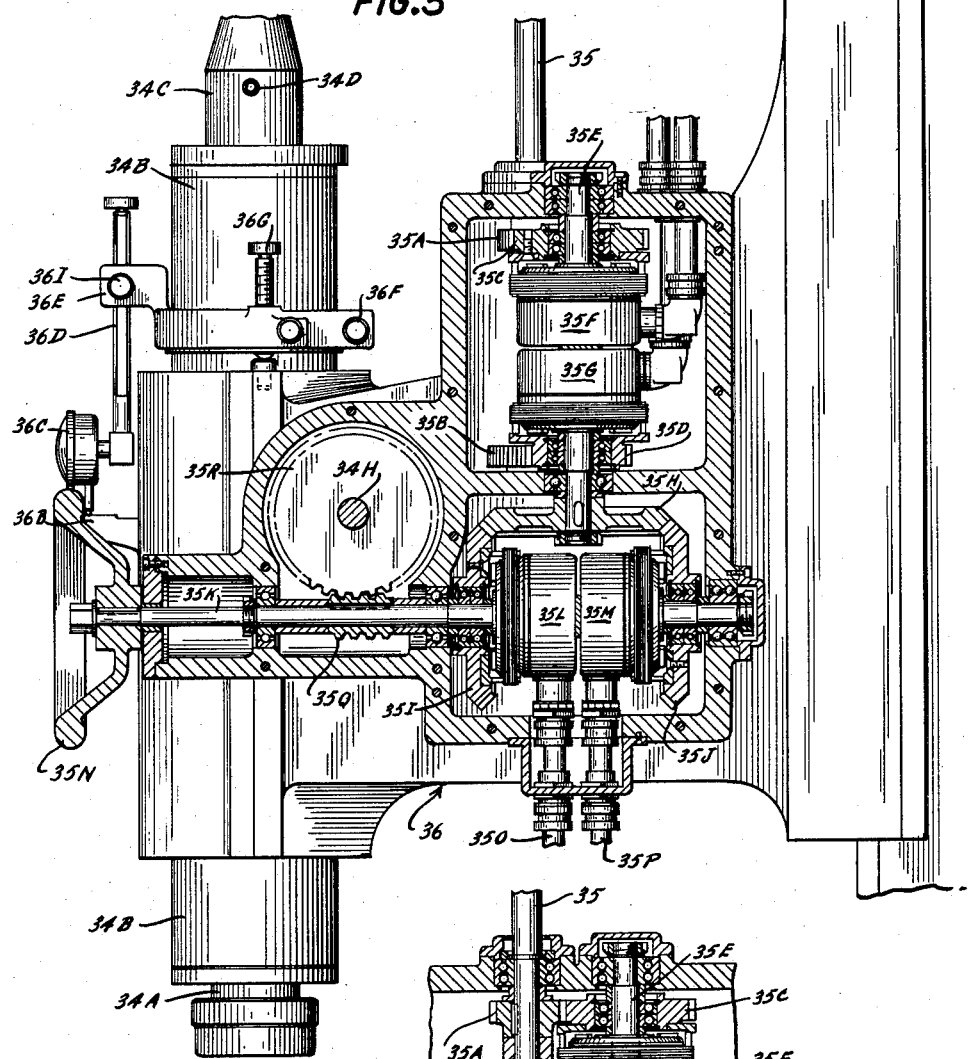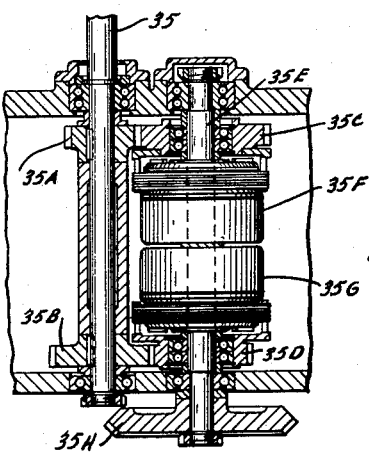

INVENTORS
M.P.BUDNEY,
H.S.BUDNEY,
T.W.BUDNEY &
M.F.SACZAWA

BY

ATTORNEY

June 29, 1965 M. P. BUDNEY ETAL 3,191,461
JIG BORER
Filed April 17, 1961 14 Sheets-Sheet 7

INVENTORS
M. P. BUDNEY,
H. S. BUDNEY,
T. W. BUDNEY &
M. F. SACZAWA
BY
ATTORNEY

INVENTORS
M. P. BUDNEY,
H. S. BUDNEY,
T. W. BUDNEY &
M. F. SACZAWA

BY
ATTORNEY

June 29, 1965  M. P. BUDNEY ETAL  3,191,461
JIG BORER
Filed April 17, 1961  14 Sheets-Sheet 9

INVENTORS
M. P. BUDNEY,
H. S. BUDNEY,
T. W. BUDNEY &
M. F. SACZAWA
BY
ATTORNEY

INVENTORS
M.P. BUDNEY,
H.S. BUDNEY,
T.W. BUDNEY &
M.F. SACZAWA

BY

ATTORNEY

June 29, 1965 M. P. BUDNEY ETAL 3,191,461
JIG BORER
Filed April 17, 1961 14 Sheets-Sheet 11

INVENTORS
M. P. BUDNEY,
H. S. BUDNEY,
T. W. BUDNEY &
M. F. SACZAWA

BY
ATTORNEY

June 29, 1965  M. P. BUDNEY ETAL  3,191,461
JIG BORER
Filed April 17, 1961  14 Sheets-Sheet 12

INVENTORS
M.P. BUDNEY,
H.S. BUDNEY,
T.W. BUDNEY &
M.F. SACZAWA
BY
ATTORNEY

June 29, 1965  M. P. BUDNEY ETAL  3,191,461
JIG BORER
Filed April 17, 1961  14 Sheets-Sheet 13
FIG. 26
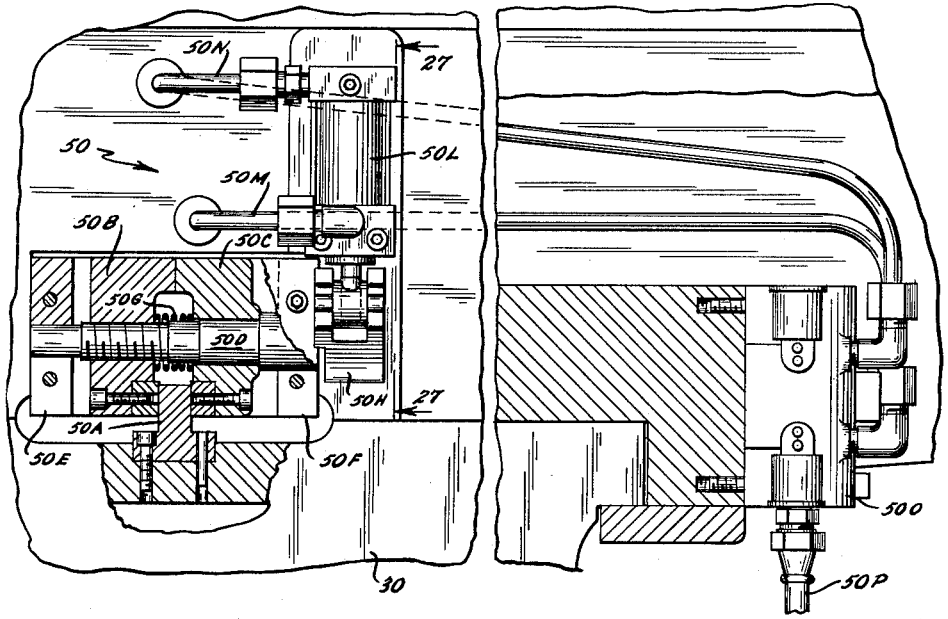
FIG. 28
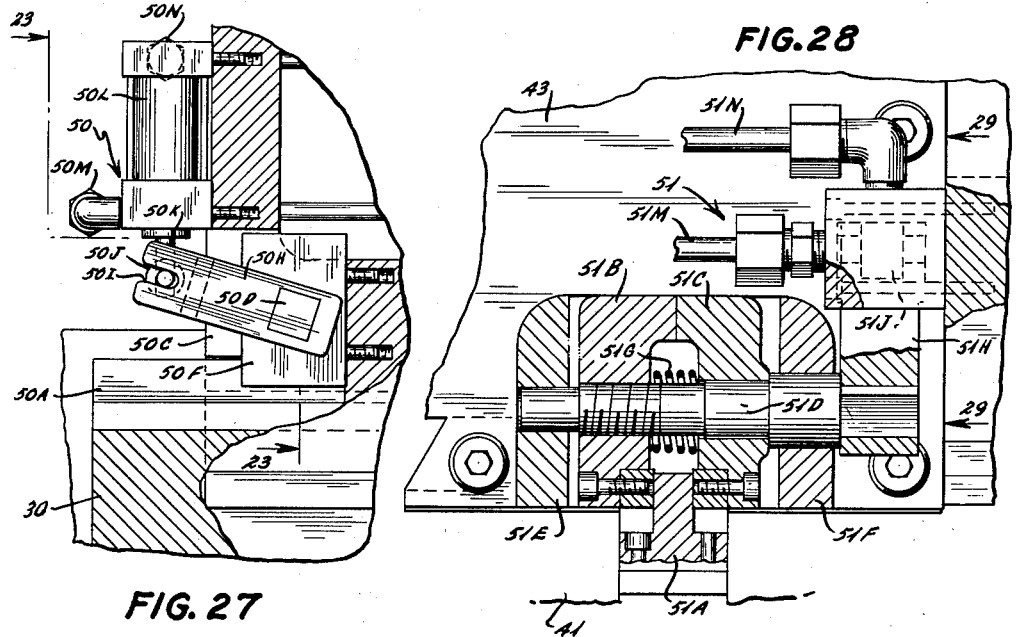
FIG. 27
INVENTORS
M. P. BUDNEY,
H. S. BUDNEY,
T. W. BUDNEY &
M. F. SACZAWA
BY
ATTORNEY

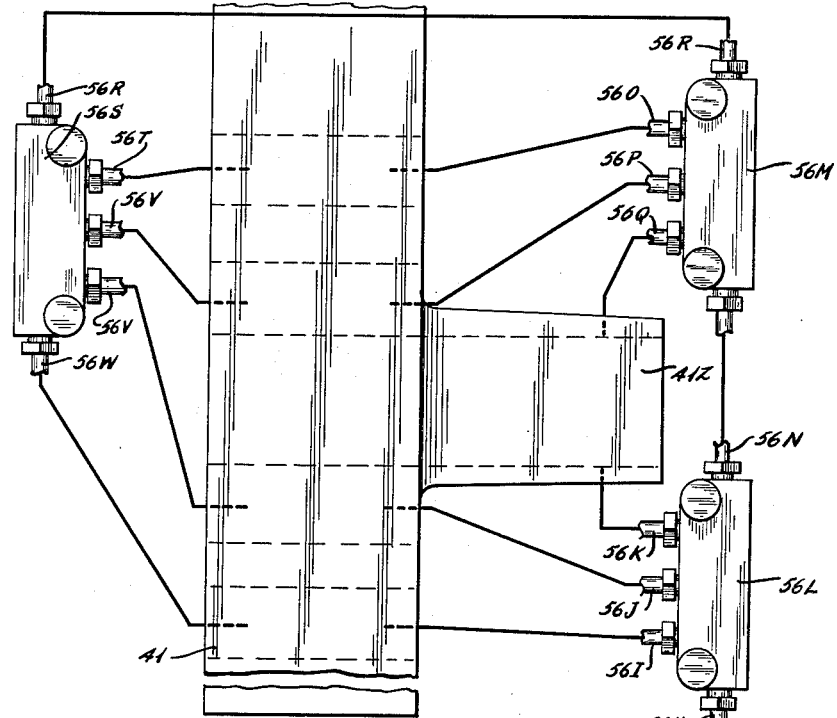
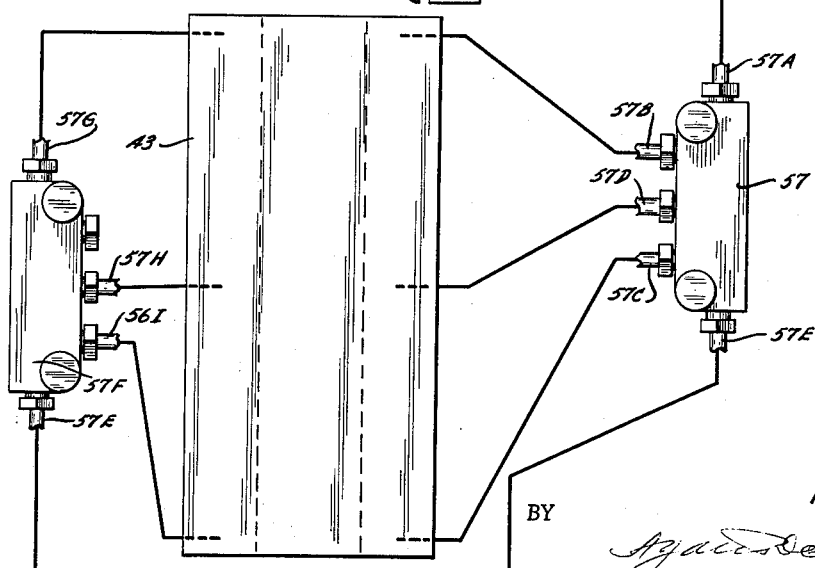
FIG.30

United States Patent Office 3,191,461
Patented June 29, 1965

3,191,461
JIG BORER
Michael P. Budney, Berlin, Henry S. Budney and Thaddeus W. Budney, Newington, and Matthew F. Saczawa, Wethersfield, Conn., assignors to Atlantic Machine Tool Works, Inc., Newington, Conn.
Filed Apr. 17, 1961, Ser. No. 113,581
1 Claim. (Cl. 77—4)

The present invention relates to a jig borer and more particularly to a jig borer which will obtain extremely high accuracies and which can be adjusted in a minimum of time and accurately checked.

Heretofore, jig borers have been provided with various controls and speed changers, but such controls and speed changers have not been at a sufficiently convenient location for the skilled artisan to obtain maximum productivity because of delays in obtaining the correct adjustment, delays in reading the adjustments and resulting delays in making corrections therefor.

An object of the present invention is to provide a machine tool of maximum accuracy which can be accurately and rapidly adjusted to take advantage of the accuracy obtainable.

Another object of the present invention is to provide a jig borer with a central control of all of the parts, thereby avoiding danger of the operator contacting the moving elements of the machine.

Another object is to provide a jig borer with a lubricating system which positively and accurately assures proper lubrication without danger of excess lubrication and without danger of unlubricated areas.

A further object is to provide an optical system for reading the rectilinear and angular positions of the parts.

Another object is to provide power controlled adjustment for all of the adjustable elements of the machine tool.

A further object is to provide power operated non-influencing clamping structures for locking the movable elements in fixed position.

A still further object is to provide both power means and manually controlled adjustment means so that adjustment can be obtained by the power means and the manual adjustment provides for final extreme acuracy.

Figure 6:
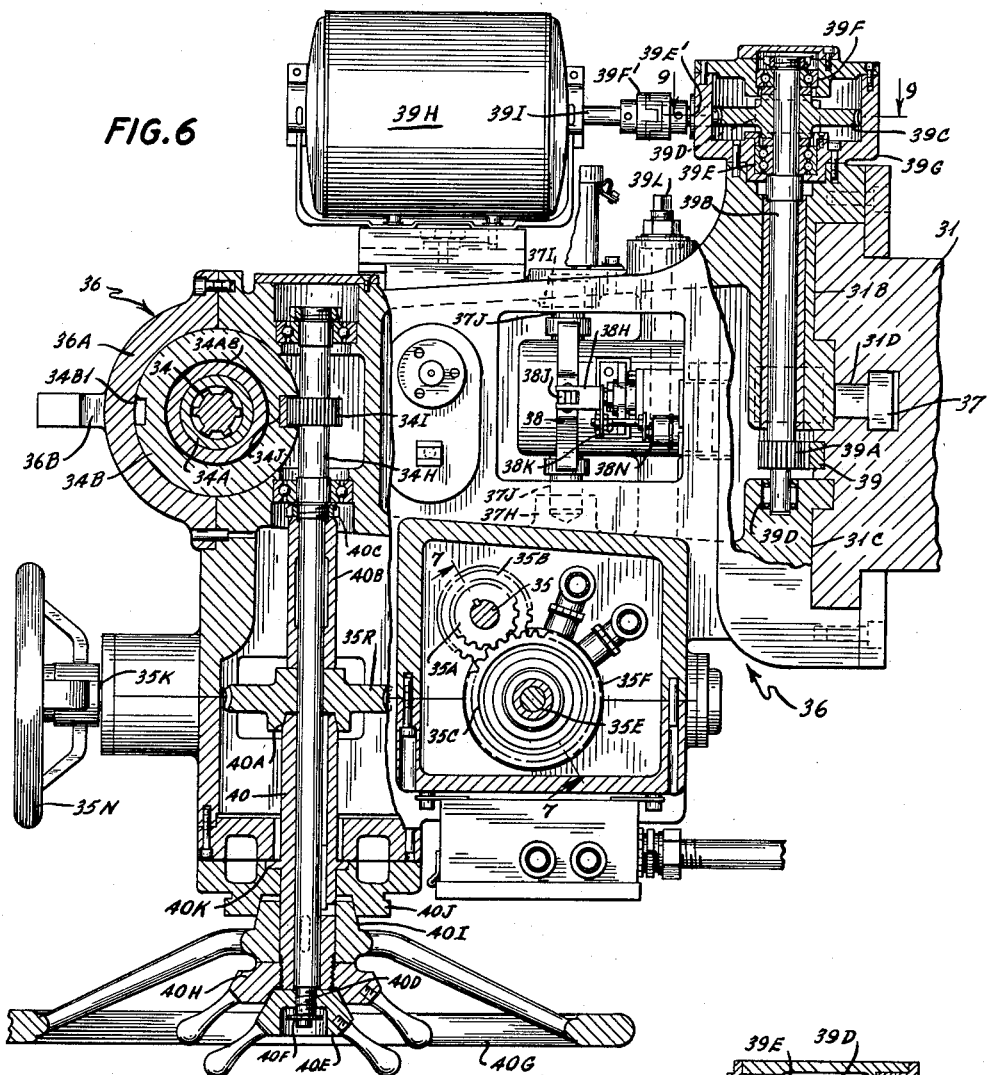
Figure 11:
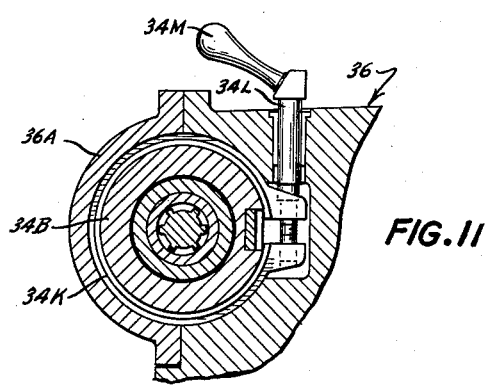
Figure 9:
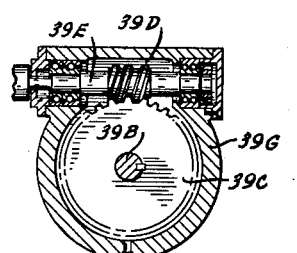
Figure 8:
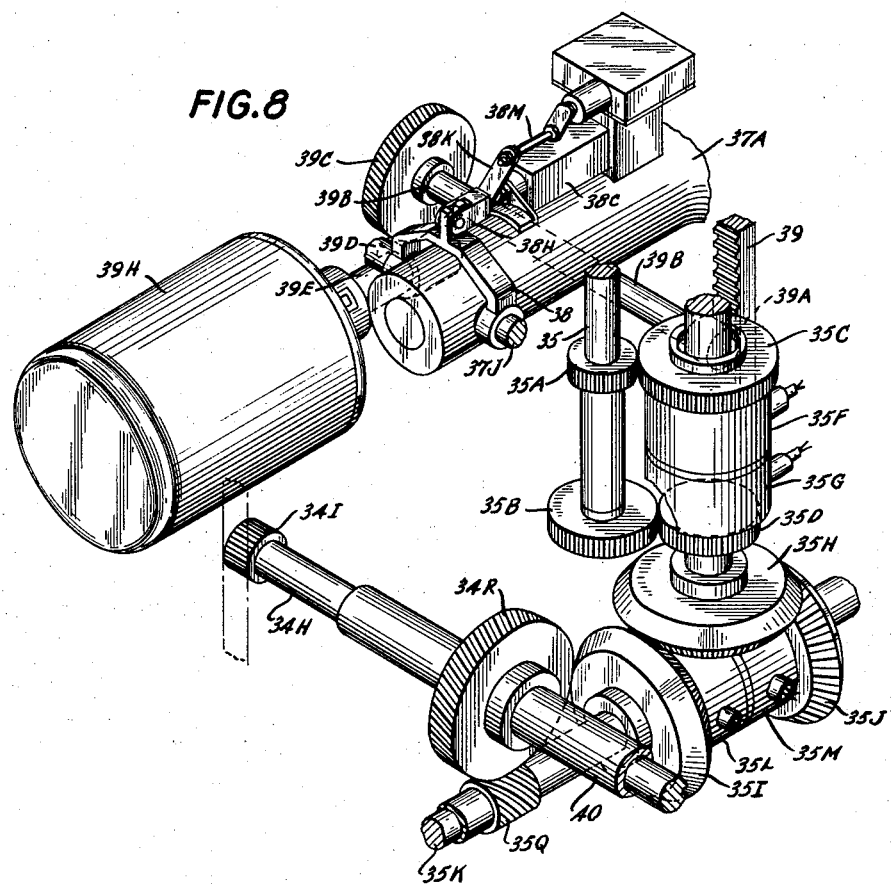
Figure 10:
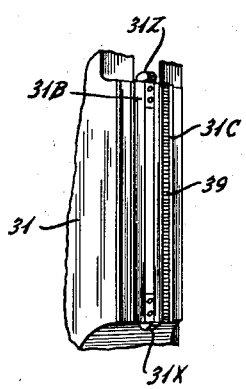
Figure 31:
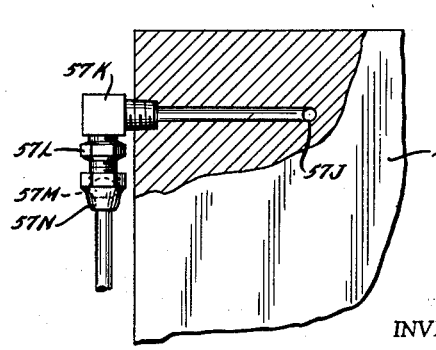
Figure 13:
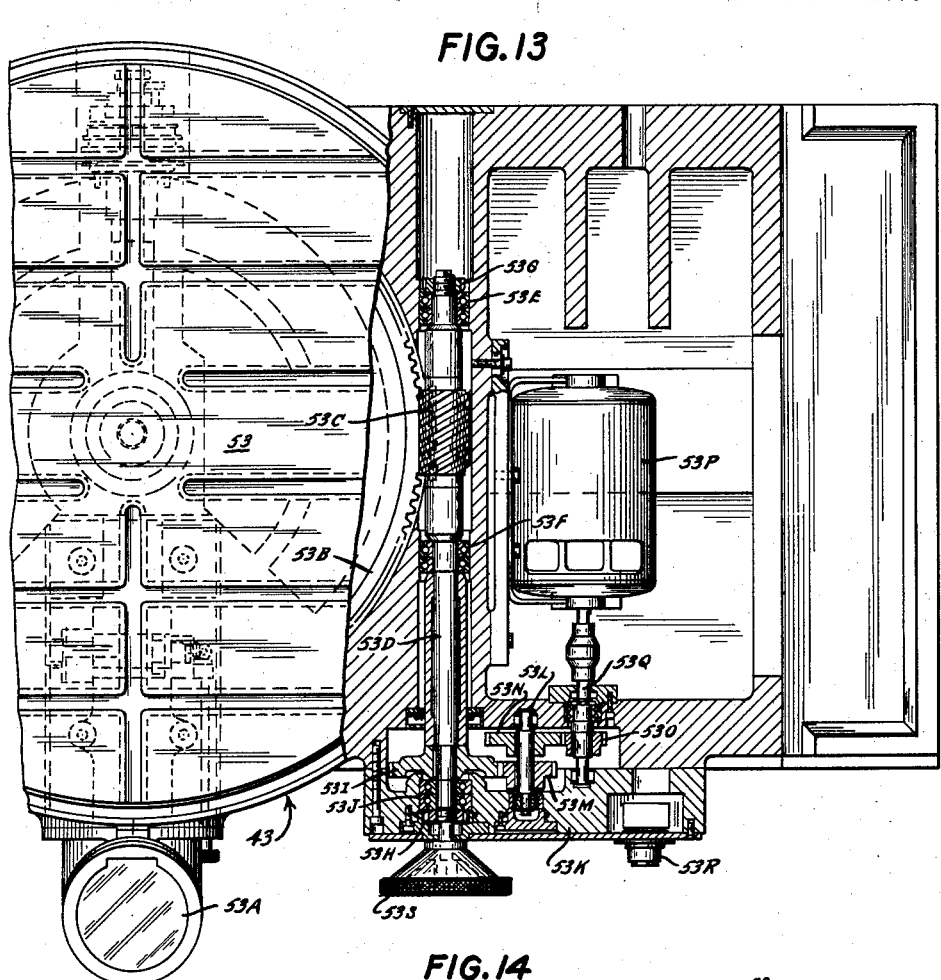
Figure 14:
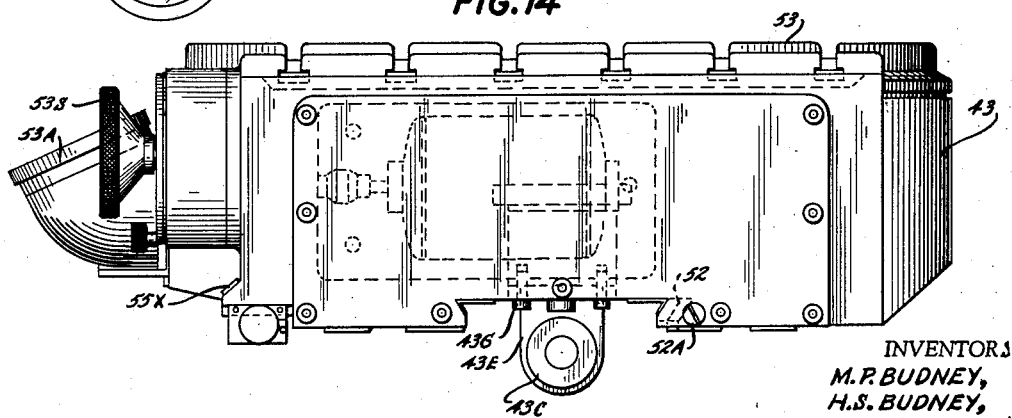
Figure 15:
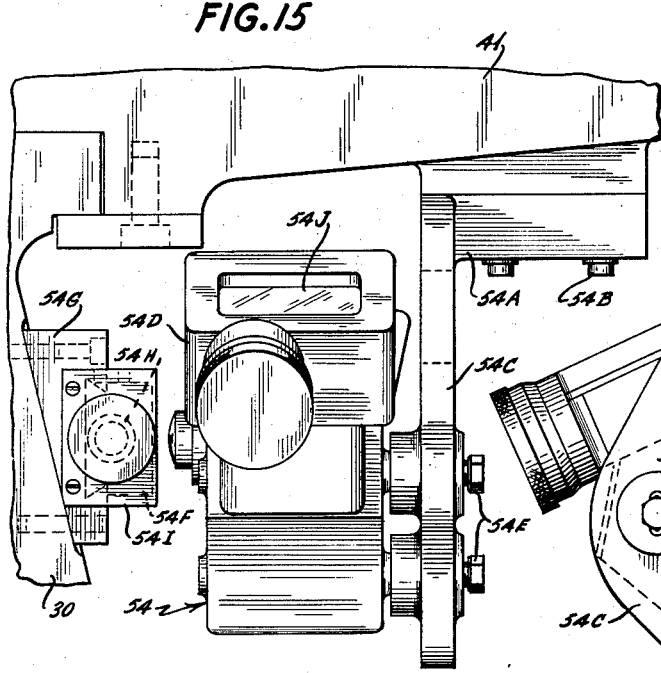
Figure 16:
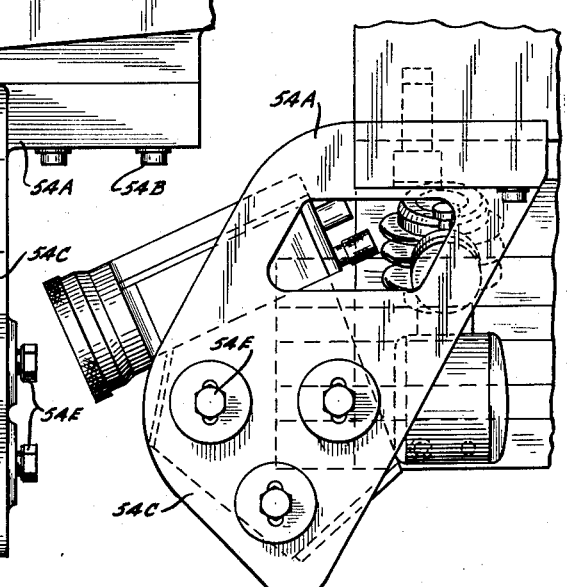
Figure 17:
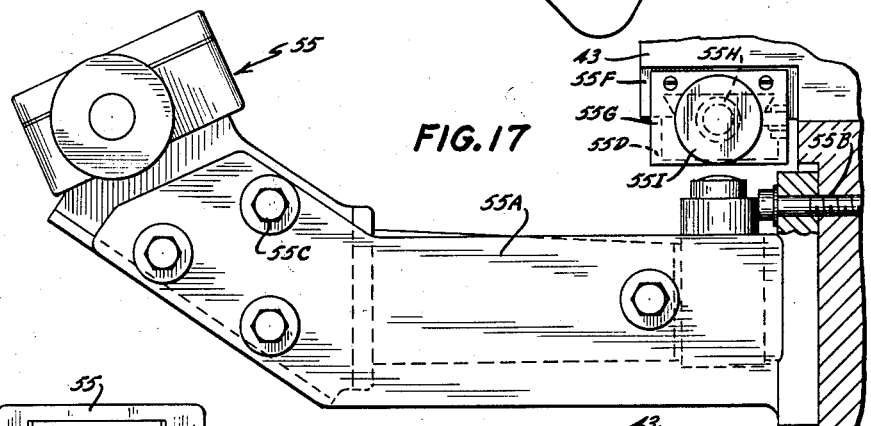
Figure 18:
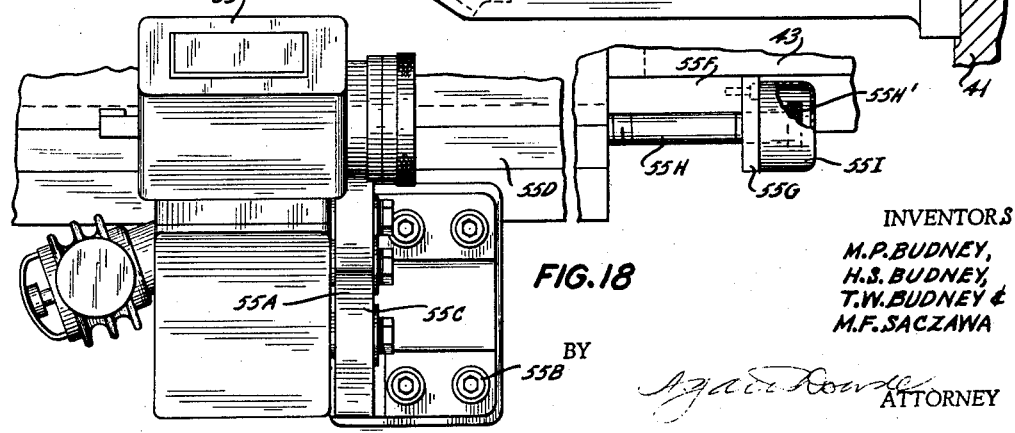
Figure 21:
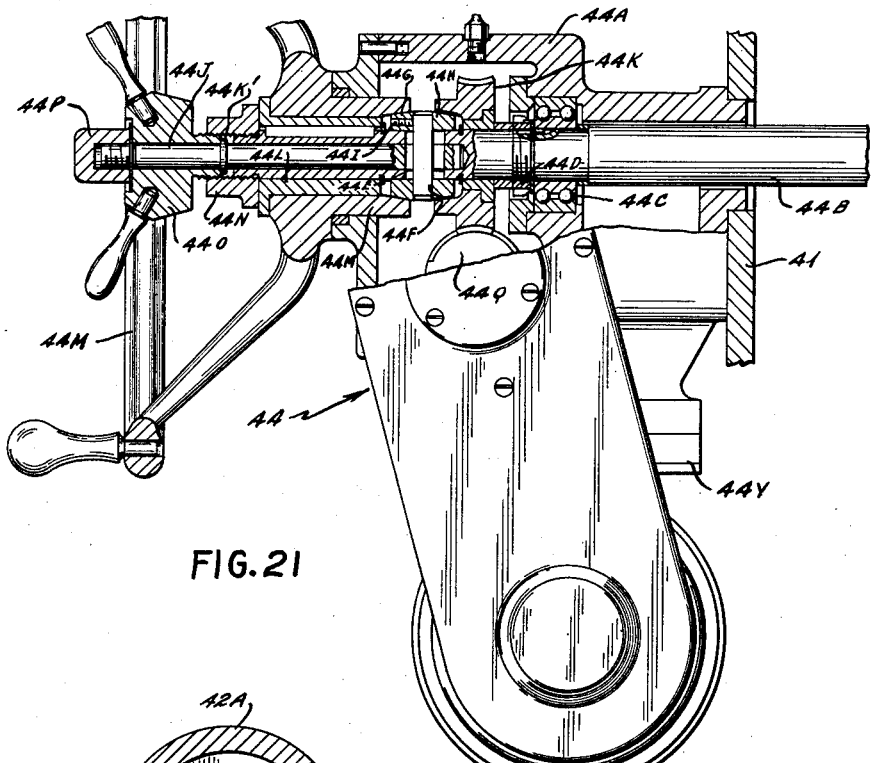
Figure 19:
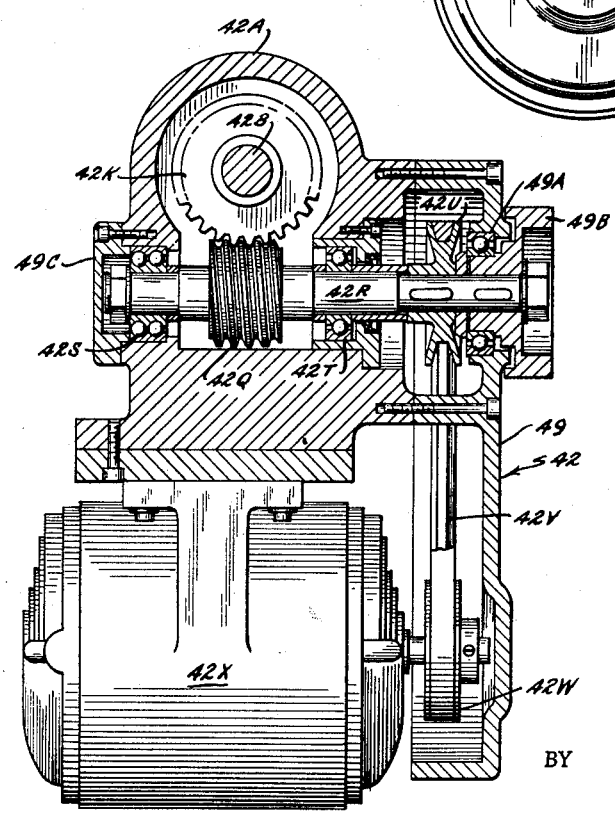
Figure 20:
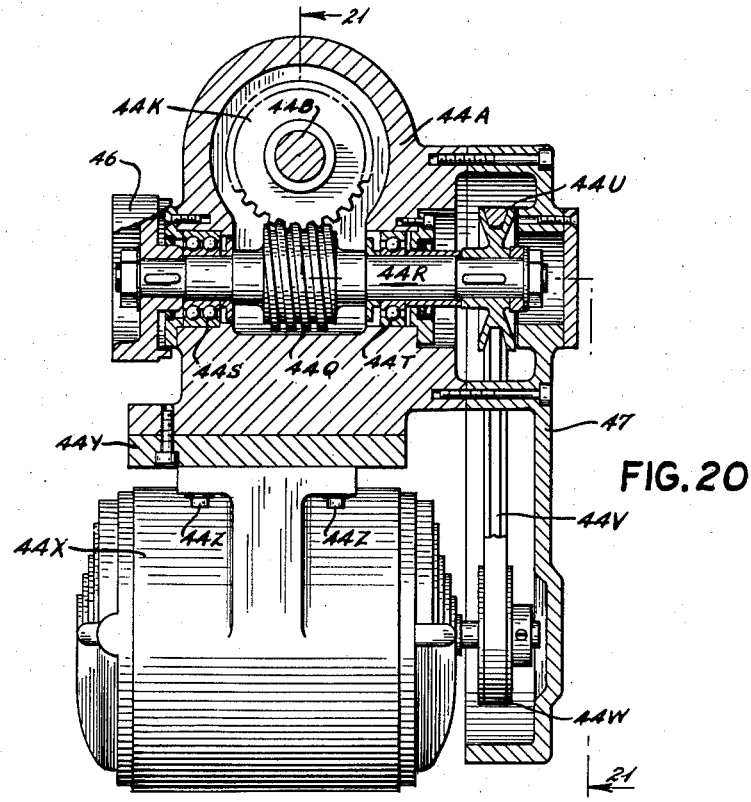
Figure 22:
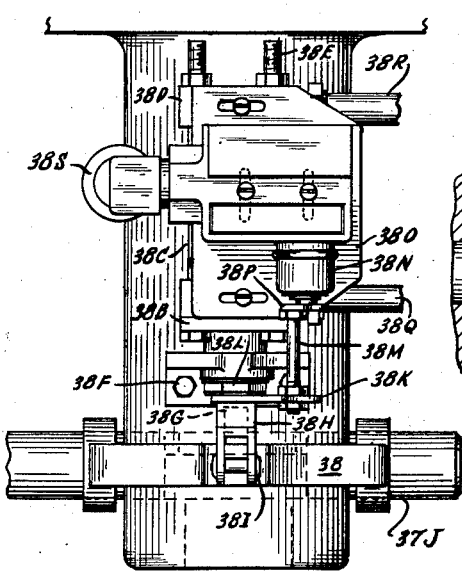
Figure 23:
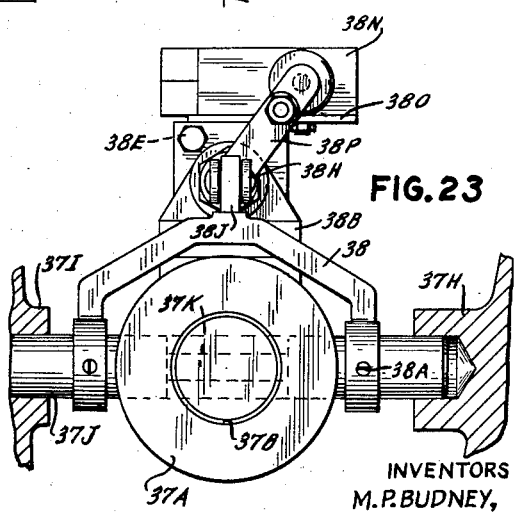
Figure 24:
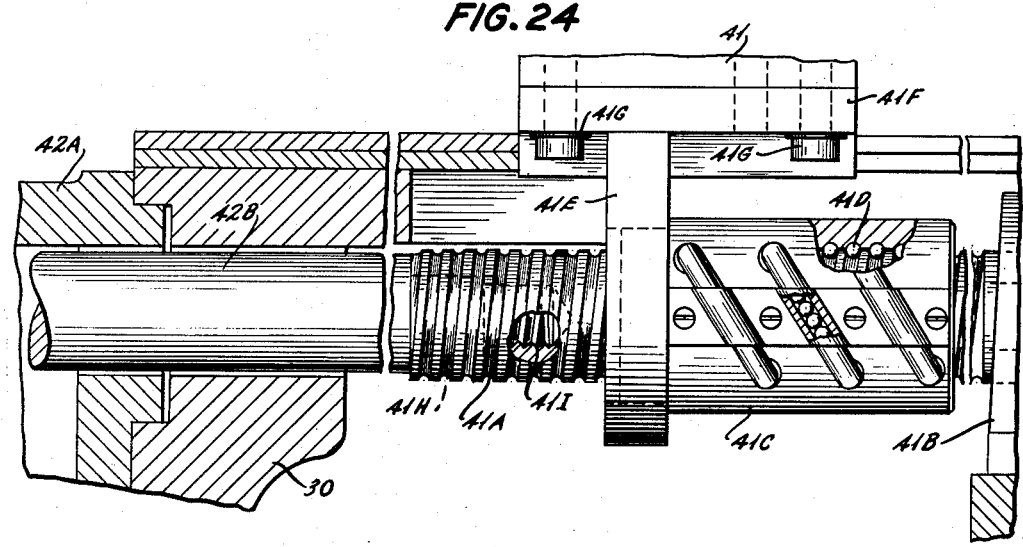
Figure 25:
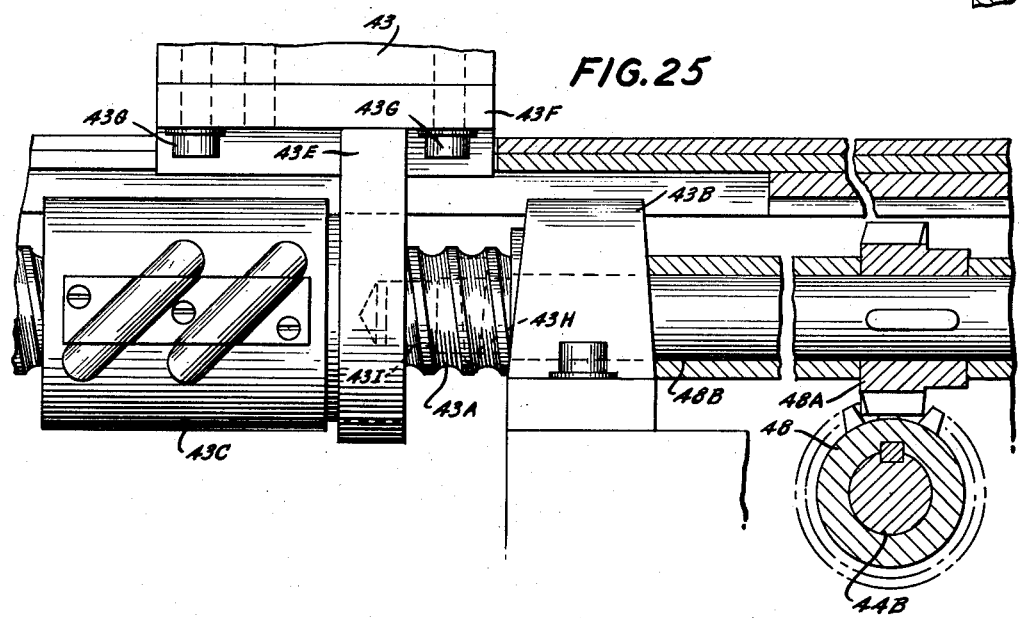

Other and further objects will be apparent as the description proceeds and upon reference to the accompanying drawings, wherein:

FIG. 1 is a front elevation of the jig borer of the present invention, showing the base and the power adjusting means for the cross slide feed screw mounted on the base and the power means for the longitudinal feed screw mounted on the cross slide and also showing a built in rotary table in the longitudinal slide including manual and power control for rotating the table, also showing clamping means for retaining the cross slide and the longitudinal slide in position, the showing also including the pivoted control panel, the power means for raising and lowering the quill housing and showing the spline connection between the splined spindle drive shaft from the variable transmission at the top of the column to the hollow spindle and further showing the optical arrangement for reading the precise positions of the cross and longitudinal slides and the angular position of the rotary table;

FIG. 2, a right end elevation of the jig borer of FIG. 1, showing angular stops for limiting the movement of the quill housing and also showing the main drive motor and the transmission with a specific mounting structure to provide increased clearance between the spindle and the column;

FIG. 3, a plan view with parts broken away and parts omitted showing the feed screw operation of the cross slide and longitudinally movable table with parts of the longitudinally movable table shown in phantom outline and showing the locking clamps for the cross slide and table;

FIG. 4, a vertical section taken substantially on the line 4—4 of FIG. 1 through the quill housing, on the axis of the quill and spindle, showing the pneumatic clamping means and the electrical control switches for clamping the quill housing in fixed position on the column;

FIG. 5, a vertical section through the quill housing taken substantially on line 5—5 of FIG. 1 through the axis of the fine feed adjustment shaft and the intermediate idler shaft and clutches providing the speed change and reversing clutches, with such clutches shown in elevation;

FIG. 6, a horizontal section through the quill housing taken substantially on line 6—6 through the axis of the coarse feed adjusting shaft, and also showing the electrical connections to the power feed speed change clutches;

FIG. 7, a vertical section taken substantially on line 7—7 of FIG. 6 through the axis of the down feed shaft and the axis of the speed change shaft and also showing the speed change electric clutches;

FIG. 8, a diagrammatic perspective with parts omitted showing the gearing in the quill housing, the motor elevating means and the quill position holding clamp;

FIG. 9, a vertical section through the quill housing elevating worm gear and worm taken substantially on the axis of the worm on the line 9—9 of FIG. 6 and FIG. 1, showing the worm non-reversing drive for operating the pinion engaging the rack on the column for raising and lowering the quill housing;

FIG. 10, a perspective of a fragment of the column showing the rack gear for cooperation with the pinion to raise and lower the quill housing and also showing the L-shaped stops to limit vertical movement of the quill housing;

FIG. 11, a horizontal section taken substantially on line 11—11 of FIG. 1, showing the clamp for locking the quill against axial adjustment;

FIG. 12, a horizontal section taken on line 12—12 through the quill of FIG. 1 showing the depth gage mounting collar in plan;

FIG. 13, a fragmentary plan view of the longitudinally slideable work supporting table taken on line 13—13 of FIG. 1 including a fragment of the rotary table and showing in the motor drive and manual adjustment for the angular positioning of the rotary table;

FIG. 14, a right end elevation of the longitudinally slideable work supporting table with the built-in rotary table;

FIG. 15, a fragmentary front elevation of the optical reading arrangement for indicating the position of the cross slide, showing the scale on the side of the base and the optical reading device suspended from the cross slide;

FIG. 16, a fragmentary right end view of the cross slide position optical reading arrangement of FIG. 15 showing the reading device on the cross slide and the scale on the base;

FIG. 17, a right side elevation of the optical scale reading device for indicating the position of the longitudinal slide with the optical reading device mounted on the cross slide and reading a scale mounted on the under surface of the longitudinal slide with the built-in rotary table;

FIG. 18, a fragmentary front elevation of the optical reading device of FIG. 17 showing the scale adjustment;

FIG. 19, a section taken substantially on broken line 19—19 of FIG. 2, showing the power operating and manual knob operating means for the cross feed shaft;

FIG. 20, a similar section taken along broken line 20—20 of FIG. 2, showing the power operating and the manual knob operating means for the longitudinal feed;

FIG. 21, a fragmentary vertical section taken substantially on broken line 21—21 of FIG. 20;

FIG. 22, an enlarged fragmentary plan of the pneumatic clamping means for maintaining the quill housing in fixed position on the column and taken substantially along line 22—22 of FIG. 4;

FIG. 23, a fragmentary elevation of the clamping means of FIG. 22, taken substantially on line 23—23 of FIG. 4, showing the pneumatic cylinder and the limit switch operated thereby;

FIG. 24, a fragmentary vertical section with parts broken away and parts omitted, taken substantially on line 24—24 of FIG. 3, through the cross slide feed screw, showing the ball bearing nut and the connection thereof to the cross slide and also showing the connection of the feed screw to the drive shaft for the feed screw;

FIG. 25, a vertical section with parts broken away and parts omitted, taken substantially on line 25—25 of FIG. 3, through the longitudinal feed screw, showing the helical gear drive for such longitudinal feed screw from the power operating means mounted on the cross slide and showing the ball nut connection of the feed screw to the longitudinally movable table;

FIG. 26, a vertical elevation with parts in section of the cross slide position locking clamp mounted on the cross slide and clamping bar on the base and showing the valve means for controlling the clamp, the view being taken substantially on line 26—26 of FIG. 3;

FIG. 27, a fragmentary section taken substantially on line 27—27 of FIGS. 3 and 23, showing the driving connection between the pneumatic cylinder and the screw for operating the clamp;

FIG. 28, a fragmentary section taken substantially on broken line 28—28 of FIGS. 1 and 3 showing the pneumatically operated clamp mounted on the longitudinal slide and cooperating with the clamp bar on the cross slide;

FIG. 29, a fragmentary elevation taken substantially on line 29—29 of FIGS. 3 and 28, showing the connection between the cooperating cylinder and piston for causing operation of the longitudinal table clamp;

FIG. 30, a fragmentary diagrammatic plan view showing the lubrication system for the ways between the cross slide and the base and the ways between the table and the cross slide for assuring accurate lubrication at all times;

FIG. 31, a fragmentary detail showing the metering of lubricant to the way surfaces.

Referring more particularly to the drawings, the jig borer of the present invention as shown in FIGS. 1 and 2 includes a base 30, having a column 31 supported thereon and mounted on the upper end of the column, is a driving motor 32 which, drives a variable speed transmission 33 mounted on a forwardly projecting shelf 31A on the column, which transmission drives a downwardly extending splined spindle drive shaft 34 and a down feed splined shaft 35.

The splined feed shaft 35 is slidably received in an inwardly splined hollow down feed shaft in the transmission 33 as described in our application Serial No. 14,073, filed March 10, 1960. The spindle drive shaft 34 is splined at its lower end and is received in a hollow spindle 34A in a manner similar to that disclosed in the prior application, the hollow spindle being rotatably supported in a quill 34B which is slidably mounted in a quill housing 36 which is slidable vertically on ways 31B, 31C in the column 31. The vertical movement of quill housing is limited by L-shaped stops 31X, 31Z secured to the column by one leg of each stop located in a receiving groove and attached by bolts.

The hollow spindle 34A is supported in bearings in a manner similar to that previously described in the prior application, but the bearing arrangement is modified and includes a pair of ball bearings 34A1, 34A2 having their inner races abutting a shoulder 34A3 on the spindle adjacent the lower end of the spindle and the outer races abutting a sleeve 34A4 in a counterbase in quill 34B with the outer races of such bearings being held in fixed relation on the quill 34B by an internally threaded collar 34A6. The inner raceways of bearings 34A2 and 34A5 are maintained in spaced relation by a spacing sleeve 34A7 and the thrust reaction is taken by an elongated spacing sleeve 34A8 which abuts the inner raceways of bearings 34A9 and 34A10, which are secured in fixed position on the spindle 34A but a nut 34A11 threaded on a reduced portion of the sipndle 34A, the outer races of bearings 34A9 and 34A10 being received in a counterbore in the quill 34B.

It will be understood that this structure assures accurate alignment of the spindle at all times and the spacing sleeves serve to increase the rigidity of the spindle by the snug fit thereon.

The drive for the spindle is accomplished by an elongated inwardly splined coupling element 34C which has a tapered upper end with inwardly extending splines for cooperation with the splines on splined shaft 34; the coupling also includes a lower portion of cylindrical interior and exterior shape which snugly receives the exterior surface of the spindle 34A and is non-rotatably secured to the spindle by a plurality of full dog set screws 34D which are threaded into the smooth cylindrical portion of the coupling and extend into radical bores in the outer periphery of the upper end of the hollow spindle, thereby providing positive driving relation. The upper end of the quill 34B is sealed by a collar 34E which has a downwardly extending circumferential skirt portion received in a counterbore of the quill and has sealing rings 34F preventing loss of lubricant and preventing foreign matter from entering the quill. The collar 34E is secured to the quill by suitable means such as socket cap screws and is connected to a counterbalancing chain 34G which extends to a counterweight or equivalent thereof in the column.

The quill housing 36 is slidably mounted in ways 31B, 31C on the column 31, and between the ways an elongated T-shaped slot 31D is provided substantially the length of the ways and loosely receives the square head of a clamping bolt 37 for securely clamping the quill housing 36 to the column 31. The clamp operating means includes a boss 37A extending from the rear wall of the quill housing, the boss 37A having a bore 37B therethrough extending substantially perpendicular to the plane of the ways of the column and such bore slidably receives a turnbuckle type adjusting element 37C for sliding and rotary movement. Such adjusting element 37C includes a threaded bore 37D at one end which snugly receives the threaded end of the bolt 37, it being understood that the head of the bolt 37 is non-rotatably received in the T-shaped slot 31D of the column 31. The other end of such adjusting element 37C is provided with a male threaded stud 37E of opposite handed threads to the threads of bolt 37 and bore 37D, threaded stud 37E is threadedly received in a cross head 37F which is slidably received in bore 37B.

The cross head 37F is provided with an eccentric receiving transverse and radial bore 37G therethrough which is designed to be in registry with a transverse bore extending through the boss 37A and also which bores in bosses 37H, 37I in the central and left webs of the quill housing so that an eccentric shaft 37J may pass through the transverse bores which are radial to the bore 37B to provide spaced bearing surfaces for such eccentric shaft 37J. The eccentric shaft 37J is provided with a reduced eccentric portion 37K with such eccentric portion being of greater axial length than the diameter of the bore 37B whereby rotation of the shaft 37J will cause eccentric portion 37K to produce longitudinal movement of cross head 37F and thereby clamping action of the head of clamping bolt 37 against the tongues of the T-shaped slot 31D, thereby securing the quill housing 36 in fixed position on the column.

To obtain the correct adjustment of the turnbuckle type adjusting element 37C, a conventional screw threaded bolt 37L is provided in a transverse bore which extends partially into the bore 37B, and the turnbuckle adjusting element 37C is provided with a series of longitudinally extending gear teeth 37M, whereby rotation of the adjusting screw 37L produced rotation of the adjusting element 37C, thereby causing the cross head 37F to become closer or more distant from the clamping bolt 37, whereby clamping action can be effectively obtained.

To operate eccentric shaft 37J an inverted Y-shaped yoke 38 has its arms provided with apertures receiving eccentric shaft 37J to which such arms are secured by suitable set screws or the like 38A, and such arms of the yoke are of dimensions to freely receive the boss 37A therebetween while permitting sufficient rotary movement of the yoke to obtain the desired clamping and unclamping action.

Secured to a seat on the boss 37A is an L-shaped bracket and cylinder head 38B which is secured to a cylinder 38C and to another cylinder head 38D by means of bolts 38E which secure the cylinder and cylinder heads together, the cylinder head 38B being secured to the seat on the boss 37A by attaching screws 38F thereby providing a positive mounting for the cylinder 38C. A conventional piston operates in the cylinder 38C and has a piston rod thereof 38G threaded at its outer end into the threaded socket of a fork member 38H having a rivet 38I passing therethrough, and such rivet is received in an open slot in the stem 38J of the inverted Y-shaped yoke member, whereby reciprocating movement of said piston rod 38G will cause said fork member 38H to move causing the fork end 38H thereof to move therewith, as shown in FIG. 3, the slot connection of stem 38J with rivet 38H permitting rotary movement of the yoke and causing rotary movement of the shaft 37J. A plate 38K is secured between the fork member 38H and a locking nut 38L, which plate 38K is adjustably connected to a bolt 38M which thereby reciprocates with the piston rod and the yoke 38 to operate a limit switch 38N which is adjustbly mounted on a mounting plate 38I-O. The switch 38N is provided with an operating flange 38P which is engaged by the head of the bolt 38M, whereby the switch will be operated in timed relation to the piston of the clamping cylinder 38C. Air or other fluid is supplied to the piston rod end of the cylinder by the tube 38Q and to the other end by tube 38R, the electrical connection to switch 38N being made through a coupling 38S connected to conduit 38T, the conduit 38T being connected to a solenoid controlled valve 38U and the tubes being connected to the solenoid controlled valve 38U which in turn is connected to a source of fluid pressure through a tube 38V.

The quill 34B is held in position by a hollow semi-cylindrical cap 36A which is secured to the main body of the quill housing by suitable bolts. The quill 34B is provided with an elongated groove 34B1 which receives a dowell pin 34B2 mounted in an aperture in the cap 36A and extending into the groove 34B1. A guiding dog 34B3 is mounted on the quill housing cap 36A to prevent rotary movement of the quill 34B while permitting longitudinal movement thereof. Quill housing cap 36A includes a forwardly extending projection 36B which is adapted to be engaged by a feeler of a dial gauge 36C, which dial gauge is slidably supported by a guide 36D which is slidable in a split collar 36E which is adjustably secured in place by a clamping screw 36F and such collar 36E also supports a limit screw 36G threaded into a threaded split bore in a projection on the collar and such limit screw is adapted to engage an abutment on the quill housing to limit the downward movement of the quill, the screw 36G being locked in adjusted position by a clamping screw 36H. The slidable rod 36D supporting the dial gauge is held in adjusted position by a thumb screw 36I engaging the flattened surface on the rod 36D to provide for adjustment of the dial gauge 36D.

The quill 34B is moved vertically by a coarse feed shaft 34H which operates a pinion 34I which engages a rack 34J whereby rotation of the shaft 34H will cause vertical movement of the quill and thereby of the spindle. When it is desired to maintain the quill in fixed relation with respect to the quill housing, a clamping ring 34K is provided in registering a groove in the quill housing 36 with a cooperating groove in the quill housing cap 36A, such collar being split and being operated by a shouldered clamping screw 34L operated by a suitable handle 34M.

To raise and lower the quill housing 36, a rack gear 39 is mounted in a groove in the column 31 and cooperates with a pinion 39A mounted on a worm gear shaft 39B which carries a worm gear 39C keyed thereto. The shaft 39B is mounted in a roller bearing 39D adjacent the pinion and is mounted in a ball thrust bearing 39E and a ball bearing 39F in a gear housing 39G with such bearing located on opposite sides of worm gear 39C. The gear housing 39G is secured to the quill housing by suitable bolts and one or more dowel pins to take the reaction. Cooperating with the worm gear 39C is a worm 39D mounted on a stub shaft 39E supported in suitable bearing including thrust bearings in gear housing 39G to prevent axial movement of said stub shaft. The stub shaft 39E is connected by means of a coupling 39F to the shaft of a motor 39H, which motor is adjustably supported on the quill housing so as to obtain substantial alignment between the motor shaft 39I and the stub shaft 39D.

To obtain low and high speed and reversing feed movement, the down feed shaft 35 is operatively connected to the coarse feed shaft 34H by a series of electrically operated clutches and suitable gearing.

The down feed shaft 35 is rotatably mounted in suitabl bearings and carries a small pinion gear 35A and a large pinion gear 35B which cooperate with a large freely rotatable gear 35C and a small freely rotatable gear 35D, respectively, on an idler intermediate shaft 35E, which shaft 35E has clutch elements fixed thereto which are selectively connected to the gears 35C or 35D by electrically operated clutches 35F or 35G, respectively, whereby the idler shaft may rotate at two different speeds depending upon which clutch is engaged, or when both clutches are disengaged the shaft 35E is free to rotate independently of shaft 35. The shaft 35E carries a driving bevel gear 35H thereon which cooperates with a pair of bevel gears 35I, 35J freely rotatable on a fine feed shaft 35K, and such bevel gears are selectively connectable to the fine feed shaft 35K by clutches 35L, 35M, respectively, whereby the fine feed shaft 35K may be driven in forward or reverse direction, depending upon which clutch is engaged, and if both clutches are disengaged the fine feed shaft 35K can be readily operated by the hand wheel 35N, suitable electrical connections being made between clutches 35L and 35M by means of couplings and conduits 35O and 35P, respectively. The fine feed shaft has a worm 35Q keyed thereon which cooperates with a worm gear 35R fixed to the coarse feed shaft 34H, whereby feeding action can be obtained for raising and lowering the quill.

The worm gear 35R can be selectively connected to coarse feed shaft 34H by means of a sleeve 40 keyed to shaft 34H and slidable thereon with the inner end of such sleeve being conically tapered at 40A for cooperation with a female conical taper in worm gear 35R whereby relative axial movement causes driving engagement and disengagement between said sleeve 40 and said worm gear 35R. The worm gear 35R is positioned between a spacing sleeve 40B and the slidable sleeve 40 with an abutment nut 40C positioning the spacing sleeve 40B in accurate location for centering worm gear 35R. The shaft 34H is threaded on a reduced outer end portion 40B and an adjusting knob 40E is threaded thereon and is prevented from complete removal by a washer 40F secured by a cap screw. A tightening action on adjusting knob 40E causing the knob to be moved toward worm gear 35R causes the slidable sleeve 40A to engage the conical clutch surface of worm gear 35R, thereby causing the worm gear to be fixed to the shaft 34H for driving the coarse feed shaft 34H by the fine feed shaft 35K. When hand manipulation is desired of the coarse feed shaft 34H, the threaded knob 40E is rotated to relieve the axial force on sleeve 40, thereby disengaging the clutch connection between the sleeve and the worm gear 35R. A hand wheel 40G is keyed to the slidable sleeve 40 and slidable thereon, but is axially moved by a second operating knob 40H which is screw threaded on the outer end of sleeve 40 so that a tightening action of knob 40H presses the hand wheel inwardly and the conical clutch portion 40I thereof engages a cooperating conical clutch portion in a disc indicator 40J, the reaction of which is taken up by a shoulder 40K on the slidable sleeve 40, thereby locking the hand wheel 40G to the disk 40J, and when the clutching action between the sleeve 40 and the worm gear 35R is disconnected the coarse feed shaft may be operated by hand wheel 40G.

To provide lubrication to the quill 34B, to the rack 34J, and pinion 34L, an oil reservoir 40L is provided in the quill housing and a suitable duct 40M extends therefrom to the bearing surface between the quill and the quill housing, thereby providing lubrication for these parts.

A cross slide 41 is slidably mounted on suitable ways on the base 30 and is moved by a feed screw 41A which is supported in a bearing 41B at the back of the machine and such feed screw cooperates with a nut 41C of the ball bearing type having a plurality of ball bearings receivable in helical grooves of the screw 41A and cooperating helical grooves in the nut 41C. Such nut 41C is mounted in a flange 41E fixed to a mounting plate 41F which is secured by bolts 41G to the cross slide 41, whereby rotation of the feed screw will cause corresponding rectilinear motion of the cross slide 41.

The forward end of the feed screw 41A is counterbored to provide an enlarged bore 4H and a threaded reduced bore 41I which receives the cross slide feed screw driving shaft 42B of a power operated cross feed motion producing unit 42.

The longitudinally movable table 43 is moved by a similar power unit 44 for producing the longitudinal movement. In the power units 42 and 44 similar parts are identified with the same suffix letters to avoid duplication of description, except where differences occur.

The longitudinally movable table 43 is moved by a feed screw 43A mounted in suitable bearings 43B on the cross slide and cooperating with such feed screw is a nut 43C having suitable balls similar to balls 41B engaging in the helical grooves of the feed screw 43A and the cooperating helical grooves in the nut 41C. Said nut 43 is supported by a downwardly extending flange 43E secured to a mounting plate 43F which is secured to the longitudinally movable table 43 by suitable screws 43G, the feed screw being provided with an enlarged counterbore 43H communicating with a smaller threaded counterbore 43I for receiving a feed screw driving shaft 48B having a cooperating threaded male end for reception in the counterbores of feed screws 43A.

Referring more particularly to FIGS. 20 and 21, the longitudinal feed screw operating power unit 44 includes a gear and clutch housing 44A in which a feed screw driving shaft 44B is rotatably mounted in an antifriction bearing 44C, the inner races of which are held in position by a nut 44D with a suitable lock nut and spacers to accurately position the inner race to take the axial thrust of the shaft 44B. The gear and clutch housing 44A is secured to the cross feed slide 41 by suitable fastening means.

The outer end of shaft 44B is provided with a longitudinal bore and communicating radial slots 44E which loosely receive a key 44F which projects downwardly beyond the periphery of the shaft 44B and mounted on the shaft 44B is a doubly conical shaped clutch element having conical surfaces 44G, 44H, with the key 44F being secured in place to clutch element 44G, 44H by a set screw 44I, whereby the clutch element may move longitudinally of the shaft 44B while being non-rotatably connected thereto. To produce such longitudinal movement, a stub shaft 44J having an intermediate shoulder 44K′ is slidably mounted in the bore in shaft 44B, the stub shaft 44J having an aperture which snugly receives the key 44F, whereby axial movement of the doubly conical shaped clutched element is obtained.

Freely rotatable on the shaft 44B is a worm gear 44K having a female clutch portion for engagement with the conical clutch portion 44H to obtain driving relation between the worm gear 44K and the shaft 44B.

A bushing 44L is rotatably mounted on shaft 44B and rotatably supports a hand wheel 44M which has a conical portion for cooperation with the conical portion 44G of the slidable clutch element, whereby axial movement of the clutch element toward said hand wheel will cause the hand wheel to connect in driving relation to the shaft 44B for manual operation of the longitudinally movable table feed screw.

Mounted on the outer end of shaft 44B is an elongated nut 44N which is threaded onto a threaded outer end of the shaft 44B. Into a threaded extension of such nut 44N, a boss of an operating knob 44O is threadedly received, said threaded boss being selectively engageable with the shoulder 44K′ to cause inward axial movement thereof and of the shaft 44J engaging clutch element 44H with worm gear 44K. A further forward extension of the shaft 44J passes through the operating knob 44O and has a threaded nut which receives an acorn type cap nut 44P and a washer whereby rotation of said operating knob 44O will cause outward movement of shaft 44J and cause clutching engagement of clutch elements 44G with the hub of the hand wheel, respectively.

To drive the worm gear 44K, a worm 44Q is mounted on a stub shaft 44R which is rotatably mounted in suitable thrust bearings 44S and ball bearing 44T. The stub shaft 44R is rotated by a belt pulley 44U keyed to the shaft 44R and driven by a belt 44V driven by a belt pulley 44W on the shaft of a motor 44X.

The motor 44X is suspended from the clutch and gear housing 44A by means of a mounting plate 44Y secured to the housing 44A by suitable bolts and the motor 44X is mounted in adjustable position by bolts 44Z.

A hand wheel 46 is keyed to the left end of shaft 44R and provides for manual adjustment of such shaft and thereby adjustment of the longitudinal feed screw to obtain any precise setting. A belt guard 47 is secured in place on the clutch and gear housing 44A by means of suitable bolts to protect the operator from the belt while permitting ready removal of the guard to facilitate belt adjustment and replacement.

The shaft 44B is provided with a helical gear 48 FIG. 25 which meshes with a helical gear 48A which is keyed to a longitudinal feed screw drive shaft 48B which is mounted in suitable bearings including pillow block 43B and a thrust bearing 48C and one or more bearings on the feed screw 43A, whereby rotation of the shaft 44B causes feeding of the longitudinally movable work-supporting table 43.

To obtain the feed movement of the cross slide, the power unit 42 is mounted by means of its clutch and gear housing 42A on the base 30 in any suitable manner and drives the cross feed screw drive shaft 42B which has progressively reduced inner ends with threads thereon for connection with the feed screw 41A previously described and such feed screw drive shaft 42B is driven by worm gear 42K which is driven by worm 42Q mounted on shaft 42R supported in suitable bearings 42S, 42T and such shaft is driven by a belt pulley 42U and belt 42V which is driven by pulley 42W from motor 42X.

A guard 49 is removably secured to the clutch housing 42A by suitable bolts and carries a bearing 49A outboard of the pulley 42U. Outboard of such bearing 49A and carried thereby is a hand operated knob 49B which provides for manual adjustment of the cross feed to obtain extremely precise adjustments thereof.

A protective cap 49C is provided at the other end of shaft 42R and detachably secured to the gear and clutch housing to prevent physical contact with the end of such shaft.

To secure the cross slide in fixed position after its adjustment by the cross feed screw, a fluid operated locking or clamping device 50 FIGS. 26–28 is provided, which clamping device cooperates with an inverted T-shaped bar 50A extending in the direction of movement of the cross slide and secured to the base 30 by suitable screws and dowels. Cooperating with such T-shaped clamping bars are a pair of clamping jaws 50B, 50C of inverted L-shape which are provided with apertures in their stem portions for receiving a threaded end and a shoulder, respectively, of a clamp operating shaft 50D which shaft is rotatably mounted in bearing blocks 50E and 50F, whereby the engagement of the shoulder of the shaft 50D with jaws 50C and the rotation of the screw threads of the shaft within the screw threaded bore of the clamping jaw 50B produces clamping and unclamping action with the unclamping action being assisted by a compression spring 50G surrounding the shaft 50D and engaging the jaws. The removable jaw faces are provided in rabbets in the facing surfaces of the jaws for contacting the clamping bar 50A and the shaft 50D is provided with a square end which receives a clamp operating lever arm 50H having a cooperating square aperture receiving the square end of shaft 50D for causing rotation of the clamping shaft 50D and thereby clamping and unclamping action.

The clamping operating lever arm 50H is provided with a forked end with each tine of the forked end being provided with an outwardly opening slot 50I, which forked end and slot snugly receive a crosshead member 50J which includes a cylindrical center portion received within the forked end and oppositely projecting stub portions loosely received within the slots 50I. The crosshead member 50J is provided with a radially threaded bore which receives the threaded end of a piston rod 50K which is operated by a piston in a cylinder 50L and such cylinder is supplied with compressed air by means of tubes 50M and 50N, which in turn are connected to a solenoid controlled four-way valve 50O, which solenoid valve is controlled by an electrical conduit 50P. It will thus be seen that the clamping and unclamping action can be accomplished by electrical control from a central panel to release or maintain the cross slide in adjusted position.

A similar clamping device 51 is provided for fixing the position of the table 43 on the cross slide 40 and includes an inverted T-shaped bar 51A fixed to the cross slide 41 by screws and dowels and such clamping bar is engaged by L-shaped clamping jaws 51B, 51C operated by a shouldered clamping screw 51D having a threaded end threadedly received in jaw 50B and an enlarged shoulder end rotatably received in jaw 51C. Shaft 51D is rotatably supported in bearings 51E, 51F and the jaws are assisted in separation by a compression spring 51G. The slidable and rotatable shaft 51D is operated by a forked lever 51H having a slot 51I in each tine thereof, which forked end and slots receive a crosshead member 51J having a cylindrical body which is received in the space between the tines and the oppositely projecting studs are received in the slots 51I. A piston rod 51K is threaded at its end into a radially extending bore in the crosshead member 51J and such piston rod is operated by a piston reciprocating in a cylinder 51L which is supplied with fluid supplied by tubes 51M, 51N, the supply to the tubes being controlled by a solenoid valve similar to solenoid valve 50O, which solenoid valve is controlled by an electrical conduit from the central control panel or other convenient location.

The jig borer is adaptable for use with a longitudinal slidable work supporting table, and is particularly useful with a built-in rotary table as an integral part of the longitudinally slidable work support table. The built-in rotary table includes cooperating way engaging bearing portions and the dovetail groove for cooperation with the ways and dovetail tongue on the cross slide. For assuring constant accuracy a tapered gib 52 is mounted in a cooperating groove connecting with the dovetail groove and is longitudinally adjustable by a screw 52A so as to vary the width of the dovetail groove to provide the accuracy of guiding action required for the extreme accuracy obtainable by the machine.

The slide 43 includes a rotary table 53 with an optical position reading device 53A which is substantially similar to the rotary table and optical reading device shown in our application, Serial No. 26,736, filed May 4, 1960, now Patent No. 3,083,594, but a modified form of table adjusting means is provided to include a rapid motion motor drive to obtain the desired angular adjustment. This motor adjustment includes a large ring worm gear 53B secured to the rotary table which cooperates with a worm 53C keyed to a shaft 53D which is rotatably supported in suitable bearings 53E, 53F with the inner races secured to the shaft by means of a nut 53G at the inner end of the shaft and a nut 53H at the outer end of the shaft, which nut also serves to retain the spacing elements in proper assembled relation and to secure a large gear 51I in position on the worm shaft.

The outer end of the shaft 50D is supported in antifriction thrust bearings 53J which are mounted in a bearing retaining housing 53K secured to the slide 43 by suitable bolts. An idler shaft 53L is rotatably supported in a roller bearing on the table 43 and ball bearings in the bearing housing 53K, which idler shaft carries a pinion 53M meshing with gear 51I and also carries a gear 53N meshing with a pinion 53O on a drive shaft 53Q rotatably supported in suitable bearings and extending into a motor receiving recess in the table 43. To drive such shaft 53Q a motor 53P has its shaft connected to the drive shaft 53Q by a suitable coupling, the motor being adjustably mounted by means of bolts and a supporting plate having elongated apertures for obtaining accurate alignment of the motor shaft with the drive shaft 53Q. A suitable control for the motor 53P may be had by the provision of a switch 53R on the built-in rotary table or by connection to a switch on the central operating panel. The shaft 53B is provided with a hand operating knob 53S which provides for precise manual adjustment to obtain the exact angular adjustment of the rotary table as viewed in the optical reading device 53A.

To accurately locate the cross slide 41 with respect to the base and with respect to the spindle, an optical reading device 54 is mounted on the cross slide by means of an L-shaped bracket having its horizontal plate 54A secured to a mounting surface on the under surface of the right extension of the cross slide by suitable bolts 54B. The vertical plate 54C carries the combination projector and reading device 54D, Higler & Watts Model TL–0506, in a desired fixed position by suitable bolts 54E passing through elongated slots in the plate 54C and threaded into the optical reading device to accurately locate the optical reading device in position to read a scale 54F which is mounted for adjustment in a dovetail of a mounting member 54G secured to the right side of the base 30 by suitable dowel and bolt connections. The scale 54F is longitudinally adjustable by an adjusting screw 54H operatively connected to the scale 54F such adjusting screw cooperating with a fixed plate 54I secured to the front end of the mounting member 54G whereby the scale 54F can be located in definite relation to the axis of the spindle 34A to be read with precise accuracy in the reading window 54J of the reading device 54D.

To read the longitudinal position of the work-supporting table 43 with respect to the cross slide 41, an optional projector and scale reading device 55, Hilger and Watts Model Ltd., is fixed to a bracket 55A secured to a front face of the cross slide 41 by bolts 55B, with the optional reading device 55 mounted on the bracket by suitable bolts 55C passing through apertures in the forwardly extending portion of the bracket and threaded into threaded apertures in the optical reading device 55. Such optical reading device cooperates with an accurate Hilger and Watts scale 55D fixed to a bracket 55W slidably supported by a dovetail tongue thereof in a dovetail groove of a mounting element 55F secured to table 43. The scale 55D has divisions of .01 inch and is purchased from Hilger and Watts. A stationary block or plate 55G is secured to one end of the mounting element 55F and such plate cooperates with a knurled knob 55H' on one end of an adjusting screw 55H which is operatively threaded into the bracket 55W of the scale 55D, whereby longitudinal adjustment of the scale can be obtained to line up the zero points of the scale and optical reading device and after the adjustment is accurately obtained a cap 55I is secured over the adjusting knurled knob 55H of the screw 55H to prevent inadvertent adjustment thereof.

A reference scale 55X, FIG. 14, is mounted on the built-in rotary table to allow rapid positioning to the nearest required inch by the power units before using the optical system, the scale being graduated to sixteenths with numerals at each inch. Similar reference scales are provided for both the longitudinal and cross field movements so that power adjustment can be used to the maximum extent.

It will be noted that the scale 55D is read from its undersurface, which arrangement permits the longitudinally movable work supporting rotary table to extend forwardly of the cross slide and also prevents dust from settling on the scale, making the scale easier to read and requiring less attention to maintain the scale in proper reading condition.

To positively assure lubricating of the ways on the base and the sliding bearing surfaces on the cross slide and also to assure adequate continuous lubrication between the table way engaging surfaces and the ways on the cross slide, a motor driven lubricator pump 56 is supported on the top of a lubricant reservoir 56A secured to an L-shaped mounting bracket including a plate 56B secured to the left side of the base 30 as shown in FIG. 1, with an outwardly extending plate 56C of the L-shaped bracket supporting a motor 56D and an electrical connection box 56E, the lubricator pump unit being a purchased product identified as Bijur No. D2136 and the reservoir being of three-pint capacity purchased and identified as Bijur No. D4122, it being understood that the motor 56D is connected to the shaft of the lubricator pump by means of a coupling 56F. Directly connected to the pump 56 is a T-coupling 56G which is connected by a flexible hose 56H to a five-way junction bar or manifold 56L which is a purchased item, Bijur No. B3263, which junction bar is secured to the cross slide 41 at a convenient location and connected by outlet tubes 56I, 56J, 56K respectively, to lubrication outlet openings on the bearing surfaces of the cross slide on the extreme right, the adjacent bearing surface and the bearing surface on the rear end of the cross slide extension 41Z. Another junction bar 56M is connected by a tube 56N to the junction bar 56L and similarly lubricates the extreme left bearing surface, the bearing surface adjacent the left end and the bearing surface on the left edge of the rear extension 41Z by tubular connections 56O, 56P, 56Q respectively.

A tubular connection 56R from junction bar 56M is connected to junction bar 56S which has tubular connections to lubricant outlet openings in the way-engaging bearing surfaces on the left end, the bearing surface adjacent the left end, the bearing surfaces at the right end and the bearing surface adjacent the right end, respectively, by tubular connections 56T, 56U, 56V, 56W, respectively, thereby furnishing lubrication respectively to all of the bearing surfaces on the cross slide cooperating with the ways on the base.

The work-supporting table has its bearing surfaces lubricated in a similar manner by a junction bar 57 which is connected to the T-connector 56G by a flexible hose 57A and extending from the junction bar 57 are a tube 57B and a tube 57C which are in communication with outlet openings on the left end and right end, respectively, of the rear way-engaging bearing surfaces of the table 43. From the junction bar 57 there is a tubular connection 57D extending to the center portion of the rear bearing surface of the table 43 to provide lubrication in the intermediate portion thereof.

A tube 57E extends from junction bar 57 to a junction bar 57F and extending from such junction bar 57F are tubes 57G, 57H and 57I which communicate with openings on the front bearing surface of the table at the left end, the center and the right end, respectively.

To obtain the desired metered lubrication at each point, an opening to the bearing surface is provided by forming a passage 57J from the exterior of the table to the bearing surface and an elbow connection 57K is screw threaded into an enlarged entrance bore in said passage 57J. A metering device 57L, purchased and identified as Bijur No. D1085 is threaded into the elbow and is connected by a suitable coupling which may be a compression type fitting including a ferrule 57M and a cooperating compression nut 57N for forcing the ferrule into a recess in the metering unit 57L and in fluid tight relation between the tube and the metering unit 57L.

The junction bars or manifolds 56L, 56M, 56S, 57 and 57F are each of the 5-way type with plugs to close the unused openings and such junction bars are secured by suitable bolts to the supporting cross slide or table.

It will thus be seen that applicants have provided a jig borer of highest accuracy and long life providing for manual control of power operation of all adjustment including control of the speed of the spindle and of the feed from a centrally located panel 58, which panel is suspended from a fitting 58A connected to the panel and to a horizontally extending tubular arm 58B having its other end fixed to a fitting 58C which is pivotally mounted on a support mounted on the column 31 and such hollow tubular arm 58B provides for electrical leads to extend from a junction box 58D supported on the column to the control panel 58. Said control panel includes a plurality of push button switches 58E which serve to control the various clutches in the transmission 33 and the clutches in the quill housing 36 to obtain the desired operating characteristics. If desired, buttons may be provided on the panel 58 to control the motors 42X and 44X for the cross feed and longitudinal feed, respectively, and a control switch may be provided for controlling the motor 53P of the built-in rotary table. Further control switches may operate the motor 39H to raise and lower the quill housing and control the lubricating motor 56D.

It will be apparent that the various clamps are also operated from suitable control switches operating valve means such as 4-way valves controlling the air pressure to the clamp operating cylinders. The various clamps are arranged to remain in clamping relation by the frictional forces thereon after the clamping action has been obtained or after the unclamping action has been accomplished so that the clamping will effectively retain the parts of the machine in adjusted relation without danger of becoming loosened even though the air pressure may fail.

The readings of the position of the rotary table, the position of the longitudinally movable slide and the position of the cross slide are measured directly on scales rather than through screw connections and it is therefore possible to obtain much higher degrees of accuracy because of the certain and positive readings of the locations of the parts with relation to the position of the spindle.

It will also be apparent that the continuous lubrication assures a uniform film of lubricant between the ways and the way engaging bearing surfaces to assure long life as well as extreme accuracy throughout the useful life of the machine.

It will be apparent that various changes may be made within the spirit and scope of the invention and that such variations within the valid interpretation of the claim are to be construed as covered in such claim.

What is claimed is:

A motor drive for rapidly operating the feed screw of a transversely movable slide relative to a way carrying member on a machine tool comprising a gear housing mounted on the way carrying member, a feed screw having a helical groove thread formed therein mounted on the way carrying member, a nut having helical groove threads for cooperating with said feed screw for mounting on a member having bearing surfaces for engagement with the ways of a way carrying member, a plurality of ball bearings mounted in said nut and cooperating with the helical groove thread in said screw and nut, whereby rolling contact is obtained through said ball between said feed screw and said nut to assure a minimum of friction and a minimum of lost motion, whereby accurate adjustment can be made between the way carrying member and the slide thereon supported, a first shaft mounted on said base, said shaft having a bore extending from the exterior thereof and terminating in a transverse slot open to the periphery of the shaft, a rod extending into said bore and having a first key receiving aperture, a key in said aperture and in said first slot projecting from opposite sides of the said shaft, a double clutch element slidably mounted on said shaft and having apertures therethrough in alignment with said slot and receiving said key, means to secure the key in said double clutch element whereby movement of said rod will cause movement of said clutch element axially of said shaft, a gear freely rotatable on said shaft meshing with a gear mounted on said feed screw and having a clutch surface for receiving one clutch surface of said double clutch element, a first handwheel rotatably mounted in said housing on a bearing supporting said shaft, said first handwheel having a clutch surface for engagement with the other clutch surface of said double clutch element, whereby axial movement of the clutch element toward and away from the first handwheel causes the handwheel to be engaged and disengaged, respectively, with said shaft, and screw means for operating the rod to move said double clutch element into selected clutch engagement with said shaft gear and said handwheel, a second shaft mounted in said housing, gear means on said second shaft meshing with the gear on said first shaft, a drive on said second shaft, a motor suspended from said gear housing and carrying a pulley for cooperating with the pulley on said second shaft, a belt interconnecting said pulleys, a switch to operate said motor in feed and reversing feed directions, and a second handwheel mounted on said second shaft for turning said second shaft when said motor is inoperative.

References Cited by the Examiner

UNITED STATES PATENTS

| | | | |
|---|---|---|---|
| 590,544 | 9/97 | Hancock | 188—40 |
| 703,818 | 7/02 | Plattenburg | 188—40 |
| 1,323,267 | 12/19 | Hanson. | |
| 1,875,016 | 8/32 | Klausmeyer | 188—43 |
| 2,391,398 | 12/45 | De Vlieg. | |
| 2,471,050 | 5/49 | Turrenttini | 33—1 |
| 2,508,281 | 5/50 | Miller et al. | 74—459 |
| 2,572,013 | 10/51 | Cushman | 33—181 |
| 2,674,706 | 4/54 | Krosp et al. | |
| 2,682,182 | 6/54 | Armitage | 77—4 |
| 2,742,801 | 4/56 | Opocensky et al. | 77—63 |
| 2,756,113 | 7/56 | Greenwood | 308—5 |
| 2,827,699 | 3/58 | Schultze | 33—1 |
| 2,832,439 | 4/58 | Wiedemann | 188—43 |
| 2,838,784 | 6/58 | Cooley et al. | 188—67 |
| 2,838,967 | 6/58 | Meyer | 77—63 |
| 2,869,933 | 1/59 | Bissinger | 308—5 |
| 2,870,542 | 1/59 | Gasper | 33—181 |
| 2,882,742 | 4/59 | Conant | 74—459 |
| 2,905,027 | 9/59 | Budney et al. | 77—4 |
| 2,924,299 | 2/60 | Kanzelberger | 188—67 |
| 2,931,253 | 4/60 | Budney et al. | 77—4 |
| 2,943,251 | 6/60 | Hull | 318—162 |
| 2,983,858 | 5/61 | Herndon | 318—162 |

FOREIGN PATENTS

| | | |
|---|---|---|
| 701,306 | 1/41 | Germany. |
| 1487 | 3/82 | Great Britain. |

OTHER REFERENCES

Fomastic Jig Borers Bulletin "With Direct Dimension Measuring and Automatic Positioning," by Fosdick Machine Tool Co., September 1957.

WILLIAM W. DYER, JR., *Primary Examiner.*

FRANK E. BAILEY, JOHN C. CHRISTIE, *Examiners.*